Feb. 24, 1925.

H. L. UNLAND

ELECTRIC STEAM BOILER

Filed April 7, 1923

1,527,762

Inventor:

Harry L. Unland

Patented Feb. 24, 1925.

1,527,762

UNITED STATES PATENT OFFICE.

HARRY L. UNLAND, OF SCHENECTADY, NEW YORK, ASSIGNOR TO GENERAL ELECTRIC COMPANY, A CORPORATION OF NEW YORK.

ELECTRIC STEAM BOILER.

Application filed April 7, 1923. Serial No. 630,655.

*To all whom it may concern:*

Be it known that I, HARRY L. UNLAND, a citizen of the United States, residing at Schenectady, in the county of Schenectady, State of New York, having invented certain new and useful Improvements in Electric Steam Boilers, of which the following is a specification.

The present invention relates to electric steam boilers of the type in which steam is generated by the passage of electric current through water into which the electrodes dip, and especially to electric boilers for use with multi-phase alternating surrent.

In the operation of such boilers, there are rather definite limits between which the current density must be maintained if efficient operation is to be obtained and, when low voltage current is to be used, this requires that the electrodes be relatively close together. This means that large electrode surfaces are required if a large output is to be obtained from a low potential current.

The object of the present invention is to provide an improved electrode construction and arrangement whereby I am enabled to obtain large electrode surfaces without the necessity of resorting to an extremely large boiler shell, and for a consideration of what I believe to be novel and my invention, attention is directed to the accompanying description and the claims appended thereto.

Figure 1:
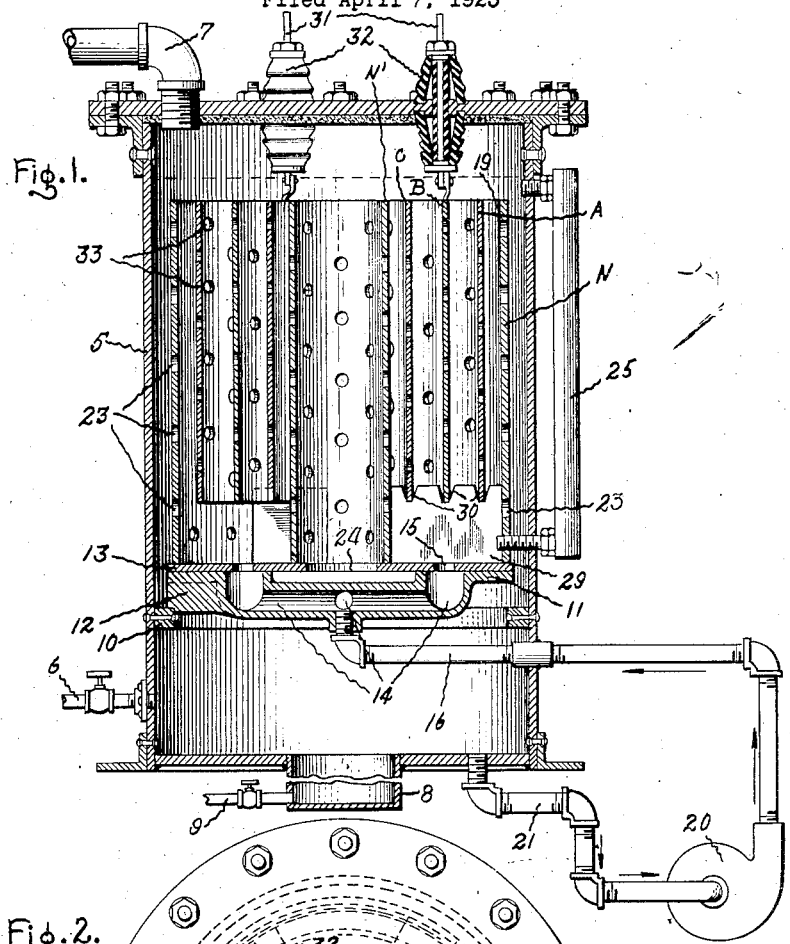
Figure 2:
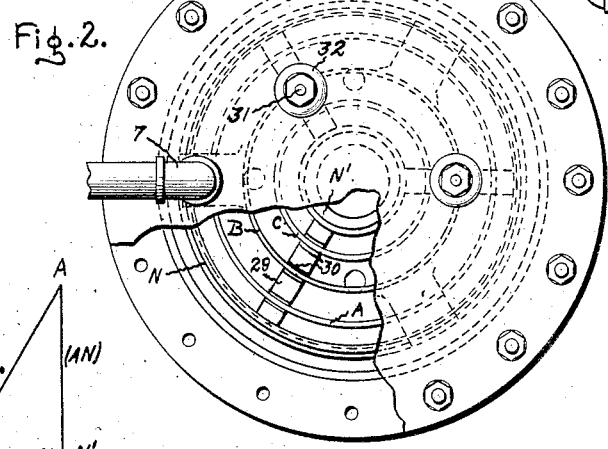
Figure 3:
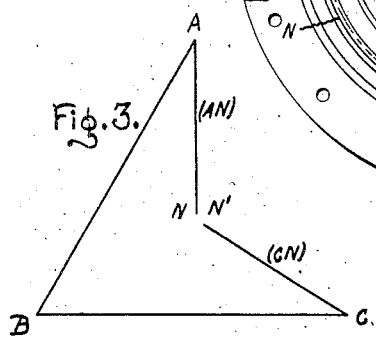

In the drawing, Fig. 1 is a vertical sectional view of an electric boiler embodying my invention; Fig. 2 is a top plan view with the cover partly broken away, and Fig. 3 is a diagram.

Referring to the drawing, 5 indicates a boiler shell or casing provided with an inlet pipe 6 for the admission of water and an outlet conduit 7 for the discharge of steam. At the bottom of the shell is a sump 8 provided with a blow-off pipe 9. The boiler shell may be of any suitable structure. Inside the shell and spaced from its bottom is a ledge 10 on which is supported a frame or spider 11 by means of suitable webs or feet 12, and mounted on the frame 11 is a plate 13. Frame 11 is shaped to provide a plurality of passages 14 which connect with holes 15 in plate 13 and to which water is supplied by a pipe 16. Mounted on plate 13 and connected together by it are two concentric cylinders N and N' which provide an annular electrode chamber 19 with which holes 15 communicate. Pipe 16 connects with the discharge side of a pump 20, the suction side of which is connected to the bottom of casing shell 5 by a pipe 21. Pump 20 when running pumps water from the bottom of shell 5 into electrode chamber 19 from whence it flows back to the bottom of the shell through holes 23 in cylinders N and N', the water passing around the edge of plate 13 and through a central opening 24 in the plate. The water will flow through holes 23 at a constant rate so that the height of the water in chamber 19 can be regulated by regulating pump 20. At 25 is a water gauge for indicating the level of the water in the electrode chamber.

In the electrode chamber are three cylindrical electrodes, A, B and C supported on plates 29 of insulating material, the plates being provided with notches 30 in their upper edges in which the electrodes rest. Connected to the electrodes are terminals 31 which enter the shell through suitable insulators 32. In the electrodes are holes 33 for the circulation of water.

In use the three phases of a three phase alternating current circuit are connected to terminals 31, cylinders N and N' serving as the grounded or neutral terminals. With this arrangement it will be clear that the voltage between electrodes B and electrodes A and C will be the phase line voltage and that the voltage between electrode A and neutral N and between electrode C and neutral N' will be the Y-voltage of the circuit (see Fig. 3). By suitably fixing the spacings between the electrodes and between the electrodes and the neutral cylinders approximately the same current can be obtained between them in each instance, thus balancing the supply line. To this end as is shown in the drawing, the distance between electrodes A and B and between electrode B and C is greater than the distance between electrode A and neutral N and electrode C and neutral N'.

By the above-described arrangement it will be seen that I obtain a large electrode surface and at the same time I utilize substantially the entire space within the boiler shell for the passage of current through the water. In other words, the water contained in the entire space between cylinders N and N' is used actively for absorbing power which means, of course, that there is practically no waste space in the boiler shell.

I have shown my invention in connection with the type of electric boiler disclosed and claimed in the patent of Merrill and Winne, No. 1,462,350, dated July 17, 1923, but it will be understood that it may be used in connection with other types of boilers.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In an electric steam boiler, spaced, concentric, cylindrical members which define between them an electrode chamber and serve as the neutral or grounded terminal, and a plurality of concentric cylindrical electrode members arranged in said electrode chamber.

2. In an electric steam boiler, spaced, concentric, cylindrical members which define between them an electrode chamber and serve as the neutral or grounded terminal, and a plurality of concentric cylindrical electrode members arranged in said electrode chamber, said electrode members being spaced so as to balance the supply line.

3. In an electric steam boiler, the combination of a shell, spaced, concentric cylindrical members mounted in the shell and providing between them an electrode chamber, said members being electrically connected to form the neutral or grounded terminal, and a plurality of spaced, concentric cylindrical electrodes mounted in said electrode chamber for connection to the phases of a multi-phase circuit.

4. In an electric steam boiler, the combination of a shell, spaced, concentric cylindrical members mounted in the shell and providing between them an electrode chamber, said members being electrically connected to form the neutral or grounded terminal, and three spaced, concentric cylindrical electrodes mounted in said electrode chamber for connection to the phases of a three-phase circuit.

5. In an electric steam boiler, the combination of spaced members forming electrodes, and means forming a neutral or grounded terminal in spaced relation to said electrodes, adjacent surfaces of said electrodes being spaced apart a distance greater than the distances between the adjacent surfaces of the electrodes and the neutral means so as to balance the supply line.

In witness whereof, I have hereunto set my hand this 6th day of April, 1923.

HARRY L. UNLAND.